United States Patent Office 3,400,110
Patented Sept. 3, 1968

3,400,110
POLYMERIZATION OF OLEFINS IN THE PRESENCE OF A CATALYST COMPRISING AN ORGANOMETALLIC COMPOUND AND THE REACTION PRODUCT OF A TRANSITION METAL COMPOUND AND A HYDROXYCHLORIDE OF A BIVALENT METAL
Pierre Dassesse, Jemeppe-sur-Sambre, and Roger Dechenne, Strombeek, Belgium, assignors to Solvay & Cie, Brussels, Belgium
No Drawing. Filed June 24, 1964, Ser. No. 377,476
Claims priority, application France, Aug. 1, 1963, 943,488; Mar. 3, 1964, 965,828
10 Claims. (Cl. 260—88.2)

The present invention relates to the polymerization and copolymerization of olefins with organometallic catalysts, and more particularly to the polymerization and copolymerization of olefins by the aid of solid catalysts comprising organometallic compounds obtained by the reaction of a transition metal compound and a hydroxychloride of a bivalent metal.

Belgian Patent No. 552,550 discloses the polymerization of ethylene in the presence of a catalyst composed of an organometallic compound and a derivative of a transition metal, deposited on an inert support such as silicon carbide, calcium phosphate, magnesium or sodium carbonate.

French Patent No. 1,291,788 discloses the polymerization of olefins in the presence of a salt of a metal of Groups III, IV, V or VIII of the Periodic Table, deposited on a support composed of an inorganic chloride having a rhombohedric structure, and containing no oxygen atoms. This catalyst is used with an organometallic cocatalyst.

In the process referred to above the catalysts have not been chemically bound to the support but were simply deposited on the surface thereof.

The polymerization and copolymerization of olefins in the presence of a catalyst in which a compound of a transition metal is chemically bound to its support is described in French Patent No. 1,306,453. This catalyst is prepared by the reaction of a organometallic compound with a combination of a transition metal which is chemically associated with an inorganic phosphate containing one or several hydroxyl groups attached to its molecule and/or water of crystallization.

Catalysts of this type present special properties which largely depend upon the nature of the support.

It has now been found, according to the present invention, that by using reaction supports of a new type, catalysts can be obtained which possess unexpected and particularly interesting properties.

According to the present invention polymerization or copolymerization of olefins is effected in the presence of a catalyst obtained by activating with an organometallic compound the reaction product of a compound of a transition metal and a solid support comprising a hydroxychloride of a bivalent metal.

A hydroxychloride of a bivalent metal M, corresponding to the formula $M(OH)Cl$, is used as the reaction support, use being preferably made of a hydroxychloride containing a compact lamellar structure. The hydroxychlorides of magnesium, calcium, cadmium, zinc and iron are particularly suitable.

These hydroxychlorides can be prepared according to well known methods, for example, from chlorides and oxides or hydroxides of bivalent metals. After reduction into fine particles and effective drying, they can be used for the reaction with the compounds of the transition metals.

The chemical fixation of the compounds of the transition metals is accomplished by the intermediary of the hydroxyl groups. If $M'$ represents a transition metal and $X$ a reactive monovalent reactive group fixed upon $M'$, the reaction can be represented by the following equation:

$$X_nM' + M(OH)Cl \rightarrow X_{n-1}M'-O-MCl + XH$$

It will be noted, however, that the fact that this reaction is possible is not a sufficient condition for obtaining a satisfactory catalyst since all bivalent metal compounds containing OH groups are not satisfactory. Thus, when the fixation reaction is effected, under identical conditions with other hydroxyl compounds, such as hydroxides, for example, inoperative catalysts are obtained.

It is necessary therefore to take into consideration the fact that the nature of the inorganic hydroxy compounds used for the fixation of the compound of a transition metal, exercises a preponderant influence upon the activity of the catalyst. Under these conditions, the choice of a hydroxychloride of a bivalent metal appears as one of the essential characteristics of the invention.

As for the compounds of the transition metals useful for the preparation of the catalysts, the selection will be made from those which contain radicals presenting a good activity towards hydroxyl groups. Especially useful for this purpose are the halides, the halo-alkoxides, and the alkoxides of the metals of groups IV–B, V–B and VI–B of the Periodic Table, and in particular the derivatives of titanium and vanadium; for example, $TiCl_4$, $Ti(OC_2H_5)_4$, $Ti(OC_2H_5)_3Cl$, $VOCl_3$, $VCl_5$ or $VO(OC_4H_9)_3$.

The fixation reaction of the compound of the transition metal is accomplished by the liberation of decomposition products. When the compound of the transition metal is a chloride, the liberation of hydrogen chloride, for example, is noted:

$$TiCl_4 + Mg(OH)Cl \rightarrow Cl_3TiOMgCl + HCl$$

When one starts with an alkoxide, a certain quantity of the corresponding alcohol is liberated. These compounds as well as the excess reactants, are removed by washing the catalysts.

The fixation reaction must be effected in the absence of moisture, for example, by raising to boiling point a suspension of the hydroxychloride in a hydrocarbon such as hexane, xylene or tetralin, containing the compound of the transition metal. When the reaction temperature is raised there is generally noted an increase in the quantity of the compound of the transition metal fixed upon the support.

In the present invention, the transition element is chemically fixed on the support; it cannot be separated by physical means such as by washing.

The catalyst thus obtained must be activated by contact with an organometallic compound selected from the organic derivatives of metals of Groups I, II, III and IV of the Periodic Table, and in particular with a trialkylaluminum or a halide of alkylaluminum. The activation can be effected immediately before the introduction of the monomers; the catalyst can thus be permitted to ripen during varied periods of time, at either room or elevated temperature.

The process according to the present invention is applied to the polymerization and the copolymerization of olefins and particularly to the production of polyethylene, polypropylene and ethylene-propylene copolymers.

Applied to the polymerization of ethylene, the catalysts of the present invention permit the preparation of a polyethylene possessing exceptionally interesting properties.

This polyethylene possesses in particular a linearity such that it contains less than 1 $CH_3$ group per 1000 carbon atoms. It shows no trace of non-vinylidenic or trans-internal saturation and only 0.10 to 0.20 vinyl double bonds per 1000 carbon atoms. The specific weight of this product is equal to or greater than 0.968 gr./cm³, which renders it particularly interesting for applications employing injection molding.

Catalysts having a hydroxychloride base show exceptional activity for the polymerization of propylene. These activities are greater than those of known catalysts, even the most active. The polypropylenes obtained possess a moderate crystallinity and a degree of insolubility in boiling heptane of the order of 35 to 50%.

The polybutene prepared by the process of the present invention is characterized in particular by a high isotacticity, which can be increased still more by a longer or shorter aging of the catalyst. Isotactic polymers of 78% and higher insolubility in ether have been obtained.

On the other hand, the productivity of the bivalent metal hydroxychloride catalysts, is extremely high and far exceeds that of known catalysts. In the case of polybutene, the productivity easily exceeds 6700 gr./h. gr. or Ti while with known catalysts having a TiCl₃ base and alkylaluminum it hardly reaches 290 gr./h. gr. of Ti.

The ethylene-propylene copolymers produced by the process of the present invention are particularly rich in propylene being characterized by an amorphous structure and very good elasticity properties.

The polymerization and copolymerization can be carried out according to known procedures: i.e. in the gaseous phase, that is to say, in the absence of any liquid medium as a solvent for the monomer, or in the presence of a dispersion medium in which the monomer is soluble. As a liquid dispersion medium use can be made of an inert hydrocarbon which is liquid under the conditions of the polymerization, or of the monomers themselves, maintained in the liquid state under their saturation pressure.

For the manufacture of ethylene-propylene elastic copolymers catalysts of the present invention permit the operation to be carried out in suspension in liquid monomers and give easily manipulatable granular products. With most of the previously known catalysts, there is obtained on the contrary, under these conditions, a compact rubbery mass, difficult to manipulate, and hence it is necessary to carry out the operation in solution.

The examples which follow are given for the purpose of illustrating the present invention and it is distinctly understood that they are in no sense to be regarded as limiting the invention claimed specifically to the examples as shown, as various modifications therefrom will be readily evident to one skilled in the art. Such variations are regarded as coming within the scope of the appended claims so long as they do not depart from the basic concept of the claimed invention.

EXAMPLE I

Magnesium hydroxychloride was prepared for use in the production of the polymerization catalyst by heating 20 gr. of $MgCl_2.6H_2O$ to 200° C. in a vessel open to the air. The melted and dehydrated mass obtained as a result of the operation was broken up and then heated in a quartz tube to 285° C. in a current of dry nitrogen.

The Mg(OH)Cl powder thus obtained was suspended in xylene containing dissolved $TiCl_4$. This solution was then brought to boiling, filtered, washed and finally there was recovered a solid having a chemically fixed titanium content, not removable by washing or other physical means, amounting to 13.7 mgr. of Ti/gr. of support.

There was then suspended in a three liter stainless steel autoclave containing 1 liter of hexane 730 mgr. of the product obtained as above described. Into this suspension was next introduced 20 ml. of a hexane solution containing 10 gr./l. of $Al(i-C_4H_9)_3$. The temperature of the solution was then raised to 85° C. and ethylene and hydrogen added, the partial pressure of each of the gases being 10 kgr./cm².

After reacting for two hours, with the pressure maintained constant by the continuous addition of ethylene, the autoclave was freed from gas, and 225 gr. of polyethylene recovered.

Analysis of the polyethylene by infrared spectrometer showed that it contained less than 1 $CH_3$ group per 1000 $CH_2$ groups, and no vinylidenic and trans-internal double bond C=C and only 0.10 to 0.20 vinylic double bond C=C per 1000 carbon atoms. The true specific weight of the polyethylene was 0.968 gr./cm.³.

EXAMPLE II (a) Preparation of Mg(OH)Cl

To a solution of 407 gr. of $MgCl_2.6H_2O$ in 270 ml. of water, maintained under agitation, was added slowly 81 gr. of MgO. Agitation at room temperature was then continued for 3 to 4 hours, after which the product was allowed to stand for 48 hours. The Mg(OH)Cl thus produced was then dried at 300° C. for 24 hours.

The product obtained as above described was broken up and then screened. The fraction passing through the 177 micron screen was then again submitted to drying for 15 hours at 250° C. in a current of nitrogen. Prepared in this manner, the product contained neither moisture nor free oxygen. It was stored in an inert atmosphere.

(b) Preparation of polymerization catalyst

A suspension was prepared consisting of 54 gr. of Mg(OH)Cl, prepared as above described, in 100 ml. of tetralin containing 9.5 gr. of dissolved $TiCl_4$. The resulting mixture was then heated to boiling and maintained under reflux for a period of 1 hour. The solid obtained as a result of this operation was washed with hexane until complete disappearance of the Cl⁻ ions in the washing liquid. The product was then dried under vacuum and then analyzed and found to contain 13 mgr. of Ti per gr.

A suspension of 741 mgr. of the above catalyst in 20 ml. of dry hexane was prepared. To this suspension was then added 67 mgr. of $Al(C_2H_5)_3$. The suspension thus obtained was next agitated for 30 minutes at 20° C. After curing, the active catalyst was ready for the polymerization experiment.

(c) Polymerization of propylene

The catalyst suspension prepared as above described was introduced under nitrogen into a stainless steel autoclave of 1.5 liter capacity, containing 500 ml. of hexane. To the latter was then added 250 gr. of pure propylene and the resulting mixture heated to 50° C. for a period of 4.5 hours.

After freeing the monomer from unreacted material, the suspension of polypropylene was poured into methanol and the resulting mixture vigorously agitated. The polymer was then separated and dried. The recovered product consisted of 179 gr. of polypropylene having the following characteristics:

Intrinsic viscosity at 140° C., l./gr. _____ 0.30
Insoluble in boiling heptane, percent _____ 41
Crystallinity determined by X-rays, percent _____ 22

EXAMPLE III (a) Preparation of Fe(OH)Cl

A mixture of 250 gr. of $FeCl_2.4H_2O$, 44 gr. of powdered iron and 110 ml. of water was introduced into a flask, the resulting mixture heated to boiling under a current of nitrogen, the heating then being continued under reflux for a period of 16 hours. The suspension of Fe(OH)Cl thus obtained was freed from the excess of chlorine by washing with methanol.

The separated solid was dried under vaccum for a period of 8 hours at room temperature and then at 120° C. for 2 hours.

The final product was stored under an atmosphere of nitrogen.

(b) Preperation of polymerization catalyst

To 100 ml. of xylene containing 9.5 gr. of dissolved TiCl₄ was added 72 gr. of Fe(OH)Cl, prepared as above described, and the resulting mixture then heated at reflux temperature for 2 hours. The mixture was then cooled and the solid recovered and washed until complete elimination of the chloride ion in the washing liquid, and then dried under vacuum.

Analysis of the dry product indicated that it contained 1.1 mgr. of titanium per gr.

A suspension consisting of 5.052 gr. of the above catalyst in 20 ml. of dry hexane was prepared and to it was then added 0.117 gr. of Al(C₂H₅)₃. The resulting suspension was raised to a temperature of 60° C. with agitation and the catalyst allowed to stand at this temperature for a period of 30 minutes. After cooling the catalytic system was ready for the polymerization experiment.

(c) Polymerization of propylene

The catalyst prepared as described above was introduced under nitrogen into a 1.5 liter autoclave containing 500 ml. of hexane. After introduction of 250 gr. of propylene, the resulting mixture was heated to 50° C. for a period of 6 hours.

After removal of the unpolymerized monomer, washing of the polymer with methanol and drying, there was obtained 74 gr. of polypropylene having the following properties:

Intrinsic viscosity at 140° C., l./gr. _____ 0.37
Insoluble in boiling heptane, percent _____ 47
Crystallinity determined by X-rays, percent _____ 27

EXAMPLES IV TO VIII

Polymerization of propylene

The results of experiments 4 to 8 inclusive, carried out under conditions similar to those of Examples 2 and 3, are compared with the latter in Table I which follows.

in hexane. The autoclave was cooled to −20° C. and 336 gr. (8 mols) of pure dry propylene condensed therein. The autoclave was then warmed and ethylene injected therein.

After reacting for 4 hours, the unreacted monomers were removed and the copolymer recovered.

The properties of the copolymers obtained in these experiments and the particular polymerization conditions used are shown in Table II below.

TABLE II.—COPOLYMERIZATION OF ETHYLENE AND PROPYLENE

| No. of example | 9 | 10 | 11 |
|---|---|---|---|
| Catalyst: | | | |
|   Amount used, gr | 399 | 420 | 438 |
|   Amount of Al(i-C₄H₉)₃, ml. sol. 100 gr./l. gr. | 4.71 | 4.96 | 5.18 |
|   Molar ratio, Al/Ti | 22 | 22 | 22 |
| Copolymerization: | | | |
|   Propylene, moles | 8 | 8 | 8 |
|   Ethylene, moles | 0.42 | 0.89 | 1.41 |
|   Molar ratio, C₃/C₂ | 19 | 9 | 5.67 |
|   Copolymers obtained, gr | 64.8 | 130 | 270 |
|   Copolymers obtained, gr./gr. catalyst | 163 | 310 | 618 |
| Properties of copolymers: | | | |
|   Propylene content, mol/mol of copolymer | 0.58 | 0.37 | 0.31 |
|   Intrinsic viscosity in xylene at 120° C. l./gr. | 0.39 | 0.77 | 0.72 |

As can be noted from Table II, the Mg(OH)Cl base catalysts show a very high activity for the copolymerization of ethylene and propylene. The copolymers obtained are characterized by a relatively high content of propylene, with regard to the composition of the starting mixture, and by a somewhat low intrinsic viscosity, indicating a not very high average molecular weight.

EXAMPLES XII AND XXI

Into a 1 liter beaker was introduced 500 ml. of MgCl₂·6H₂O at a concentration of 813 gr./l. (2 mol gr./l.) and while mechanically agitating 80.6 gr. (2 mol gr.) of MgO was added over a period of about 15 minutes. Agitation was continued until the mixture became a solid mass, after which the latter was permitted to

TABLE I.—POLYMERIZATION OF PROPYLENE

| No. of examples | 2 | 3 | 4 | 5 | 6 | 7 | 8 |
|---|---|---|---|---|---|---|---|
| Catalyst: | | | | | | | |
|   Nature of Support | Mg(OH)Cl | Fe(OH)Cl | Mg(OH)Cl | Mg(OH)Cl | Mg(OH)Cl | Fe(OH)Cl | Ca(OH)₂ |
|   Temperature of the fixation reaction, ° C | 207 | 140 | 207 | 207 | 207 | 207 | 70 |
|   Titanium content, mgr./gr | 13 | 1.1 | 13 | 13 | 13 | 13 | 23 |
|   Amount of catalyst used, gr | 0.741 | 5.052 | 1.356 | 0.672 | 1.027 | 1.677 | 3.098 |
|   Nature of cocatalyst | AlEt₃ | AlEt₃ | AlEt₃ | AlEt₃ | AliBu₃ | AlEt₃ | AlEt₃ |
|   Amount of cocatalyst, gr | 0.067 | 0.117 | 0.117 | 0.058 | 0.157 | 0.109 | 0.921 |
|   Molar ratio, Al/Ti | 2.9 | 8.5 | 2.75 | 2.8 | 2.8 | 2.1 | 5.4 |
| Curing: | | | | | | | |
|   Temp. ° C | 20 | 60 | 60 | 60 | 60 | 60 | 60 |
|   Time, minutes | 30 | 30 | 30 | 30 | 30 | 30 | 30 |
| Polymerization: | | | | | | | |
|   Temperature, ° C | 50 | 50 | 50 | 50 | 50 | 50 | 80 |
|   Duration, hrs | 4.5 | 6 | 5 | 5 | 3.5 | 5 | 5 |
|   Production of polypropylene, gr | 179 | 74 | 194 | 166 | 201 | 49 | 0 |
|   Productivity, gr./gr. catalyst, total | 222 | 14.3 | 131 | 227 | 170 | 27.4 | 0 |
| Properties of Polypropylene: | | | | | | | |
|   Intrinsic viscosity at 140° C., l./gr | 0.30 | 0.37 | 0.29 | | | 0.41 | |
|   Insoluble in boiling heptane, percent | 41 | 47 | 39 | | 34.1 | 48.7 | |
|   Crystallinity by X-rays, percent | 22 | 27 | 23 | 18 | 18 | 23 | |

Examination of Table I above clearly shows that the catalysts based on hydroxychlorides of bivalent metals are extremely active for the polymerization of propylene this being particularly the case with catalysts containing magnesium hydroxychloride.

On the contrary, catalysts obtained by reaction between the hydroxides of these same bivalent metals (Ca(OH)₂, for example) and TiCl₄ are entirely inactive.

EXAMPLES IX TO XI

Copolymerization of ethylene and propylene

In Examples 9–11 there was added to an autoclave of 1.5 l., capacity variable quantities of the catalysts prepared as described in Example 2, by reaction between Mg(OH)Cl and TiCl₄ and a corresponding amount of a solution at a concentration of 100 gr./l. of

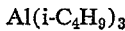

Al(i-C₄H₉)₃ stand for 48 hours. The contents of the beaker were then removed, broken up, screened, and dried under a current of nitrogen for 16 hours at 250° C.

Thirty grams of the above dry product were then introduced under a blanket of pure dry nitrogen into a cooled 1 liter flask containing 120 ml of a 2.5% by volume solution of TiCl₄, in hexane. This solution was then heated to reflux temperature for a period of 1 hour. After permitting the solution to cool it was filtered. The separated solid was resuspended several times in hexane and washed with the latter until the chloride ion in the filtrate completely disappeared.

After drying under a current of pure nitrogen, the pinkish solid obtained showed a titanium content of 10 mgr./gr. of solid.

The catalyst thus prepared was used with others prepared in the same manner for a series of experiments for the polymerization of butene-1 in accordance with the operating procedures shown below. The results of these experiments are given in Table III below.

There was introduced into a flask provided with a three way stop-cock, 2.53 gr. of the product of the reaction of magnesium hydroxychloride with titanium tetrachloride, prepared as described above, and after having undergone varying degrees of aging. To the latter was then added about 20 ml. of anhydrous cyclohexane and 90 mgr. of $Al(C_2H_5)_3$. The resulting suspension was homogenized and then introduced into a stainless steel 3 liter autoclave where it was maintained for a period of time at 60° C. while agitating (curing). Into the autoclave was then introduced 1500 ml. of butene-1 in the liquid state, the temperature being maintained at 40° C.

After polymerization for 4 hours, the unpolymerized butene-1 was removed and 1.5 liters of cyclohexane containing some mls. of methanol were then introduced into the autoclave and the resulting suspension agitated for 3 hours at 40° C. to dissolve the polybutene formed. The viscous mass obtained was treated with methanol while mechanically agitating in order to precipitate the polybutene. The recovered polymer was air dried and then dried under vacuum at 50° C.

product of compounds selected from the group consisting of halides, haloalkoxides, and alkoxides of transition metals selected from the group consisting of the elements of Groups IV–B, V–B and VI–B with a solid catalyst support comprising an hydroxychloride of a metel selected from the group consisting of magnesium, calcium, cadmium, zinc and iron.

2. The process of claim 1, in which the metal hydroxychloride is magnesium hydroxychloride.

3. The process of claim 1, in which the metal hydroxychloride is ferrous hydroxychloride.

4. The process of claim 1, in which the transistion metal is titanium.

5. The process of claim 4, in which the titanium compound is a titanium halide.

6. The process of claim 1, in which the transition metal is vanadium.

7. The process of claim 6, in which the vanadium compound is a vanadium halide.

8. The process of claim 1, in which the organic derivative is of aluminum.

9. The process of claim 8, in which the organic derivative of aluminum is a trialkylaluminum or a halide of a trialkylaluminum.

TABLE III.—POLYMERIZATION OF BUTENE-1

| No. | Ti content of catalyst, mg./gr. | Time of aging (after reaction) (hrs.) | Time of curing (after activation) (min.) | Productivity, gr. polybutene h. gr of Ti | Viscosity, l./gr. | Isotacticity, percent insol. in boil. ether |
|---|---|---|---|---|---|---|
| 12 | 10.0 | 215 |  | 1,862 | 0.40 | 56.1 |
| 13 | 10.0 | 640 |  | 918 | 0.43 | 64.0 |
| 14 | 10.0 | 645 |  | 174 | 0.43 | 70.0 |
| 15 | 10.0 | 350 | 15 | 518 | 0.46 | 67.1 |
| 16 | 10.0 | 270 | 30 | 376 | 0.54 | 70.2 |
| 17 | 10.7 | 30 |  | 6,760 | 0.28 | 55.4 |
| 18 | 10.7 | 386 |  | 1,127 | 0.49 | 66.8 |
| 19 | 8.5 | 40 |  | 4,780 | 0.41 | 54.9 |
| 20 | 8.5 | 144 |  | 3,150 | 0.54 | 55.4 |
| 21 | 8.5 | 266 |  | 871 | 0.52 | 61.7 |

In the light of the results shown in Table III, it can be concluded that the aging of the catalyst and also its curing produce a lowering of its productivity at the same time that they increase the stereospecificity. By choosing judiciously the degree of aging of the catalyst, it is possible to prepare polybutene with an increased content of isotactic polymer, all while maintaining good yields of the desired products.

What is claimed is:

1. In a process for the polymerization and copolymerization of olefins, the improvement comprising effecting the reaction in the presence of a catalyst obtained by activating with an organic derivative of a metal selected from the group consisting of the elements of Groups I, II, III–A and IV–A of the Periodic Table the reaction 10. The process of claim 8 wherein the titanium and vanadium compounds are selected from the group consisting of $TiCl_4$, $Ti(OC_2H_5)_4$, $Ti(OC_2H_5)_3Cl$, $VOCl_3$, $VCl_5$ and $VO(OC_4H_9)_3$.

References Cited

UNITED STATES PATENTS 3,252,959  5/1966  Moretti et al. _____ 260—94.9
3,221,002  11/1965  Orzechowski et al. ___ 260—94.9
3,214,417  10/1965  Bloyaert et al. _____ 260—88.2

JOSEPH L. SCHOFER, *Primary Examiner.*

M. B. KURTZMAN, *Assistant Examiner.*